Nov. 16, 1965   J. BAER   3,218,039
APPARATUS FOR MIXING INGREDIENTS OF SYNTHETIC
RESINS AND THE LIKE
Filed June 28, 1962
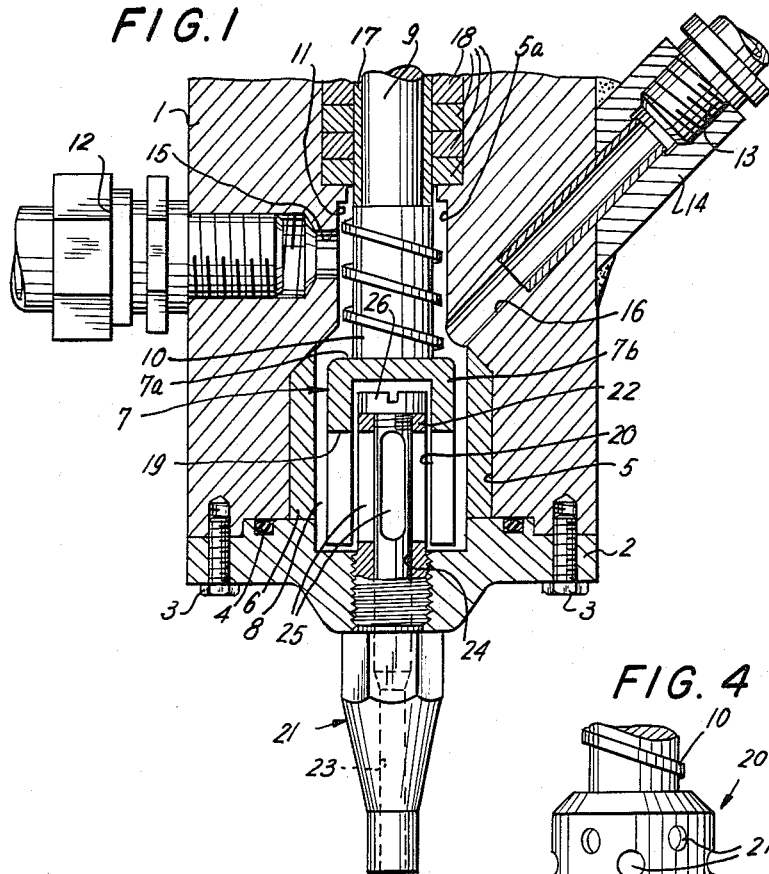
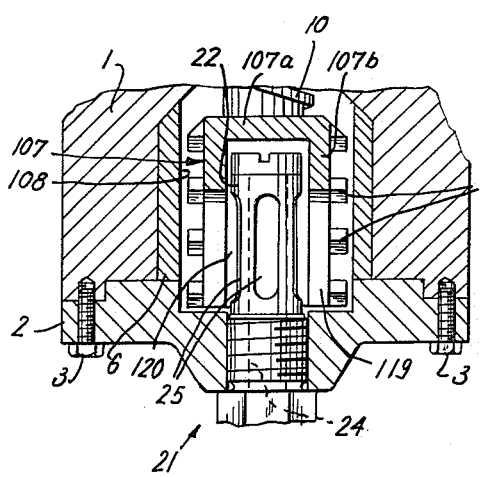
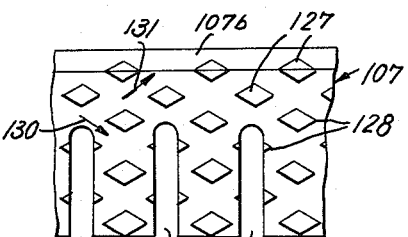
INVENTOR.
JOSEF BAER
BY
Michael S. Striker
ATTORNEY United States Patent Office
3,218,039
Patented Nov. 16, 1965

3,218,039
APPARATUS FOR MIXING INGREDIENTS OF SYNTHETIC RESINS AND THE LIKE
Josef Baer, Weingarten, Wurttemberg, Germany, assignor, by mesne assignments, to H. V. Hardman Co. Incorporated, a corporation of New Jersey
Filed June 28, 1962, Ser. No. 205,966
Claims priority, application Germany, June 30, 1961, B 63,098
4 Claims. (Cl. 259—6)

The present invention relates to a mixing apparatus for intimately mixing two or more substances which are capable of flowing. More particularly, the invention relates to means for forming highly homogenized mixtures of two or more ingredients of synthetic resins, such as epoxy, polyester, resorcinol and others.

An important object of the invention is to provide an apparatus for intimately mixing two or more revolving ingredients in such a way that centrifugal force cannot affect the quality of the ultimate mixture.

Another object of the invention is to provide an apparatus for obtaining a highly homogenized mixture of two or more ingredients in a continuous manner and according to which such highly homogenized mixture can be obtained within exceptionally short periods of time.

A further object of the invention is to provide an apparatus for intimately mixing two or more ingredients of synthetic resins according to which the mixing action is completed at such speed that heat developing during mixing cannot bring about or even initiate premature polymerization or hardening of the mixture.

An additional object of my invention is to provide an apparatus in which the aforesaid mixing operations can be carried out in a very small confined area so that dead space is reduced or eliminated to make sure that all portions of a mixture in the apparatus are homogenized to the same extent.

Another object of the invention is to provide a mixing apparatus which can be readily taken apart preparatory to its use for mixing of different groups of ingredients so that periods of idleness between successive formations of different mixtures are reduced to a minimum.

Still another object of the invention is to provide an exceptionally simple, compact and reliable apparatus of the just outlined characteristics wherein the ingredients meet very little resistance while advancing from the intake to the discharge end of the apparatus so that the apparatus may operate without stationary baffles, oppositely revolving blades or vanes and similar space-consuming and cost-increasing components.

A further object of the invention is to provide a mixing apparatus which can be rapidly converted for mixing of readily flowing or highly viscous ingredients.

An additional object of my invention is to provide an apparatus of the above outlined characteristics wherein a specially mounted and specially constructed single rotary mixing element can produce highly homogenized mixtures of two, three or more ingredients.

Another object of the invention is to provide a single- or multi-stage mixing apparatus wherein two or more revolving ingredients of different specific weight may be transformed into a highly homogenized mixture while flowing counter to the action of centrifugal force.

With the above objects in view, the apparatus of the invention is provided with a hollow body which rotates about its axis at a speed which is sufficient to transform its contents into an at least partially homogenized mixture. This mixture is then continuously expelled (as by suction or by pressure) radially inwardly and thereupon in the axial direction of the hollow body.

In accordance with a feature of my invention, such radially inwardly expelled mixture is caused to assume the shape of a second or inner hollow body of rotation which is formed within and which is coaxial with the first mentioned body, and this second body is again rotated about its axis at a speed necessary to transform its contents into a highly homogenized mixture which is thereupon expelled radially inwardly and is continuously evacuated in the axial direction of the second body at the same rate at which additional quantities of two or more different ingredients are being admitted into the first or outer fluid body.

If necessary, the contents of the outer fluid body may be subjected to a thorough stirring action before the resulting mixture is expelled radially inwardly to form a second or inner fluid body or to be evacuated in the axial direction of the outer body. The apparatus of my invention is especially suited for mixing flowing or flowable ingredients of synthetic resins, for example, ingredients of polyester, epoxy or resorcinol resins. However, it can also be resorted to in many other instances when two or more liquids, one liquid and one or more comminuted solid ingredients, or one comminuted solid ingredient and one or more liquid ingredients must be combined into a homogeneous mixture. As utilized in the following part of this description and in the appended claims, the expression "flowing" is intended to embrace all such types of liquids, more or less viscous pastes, powders, granules and other substances which may be combined to form a homogeneous mixture.

A very important advantage provided by my apparatus is that two or more ingredients are homogenized not only by rotation and/or stirring but also while moving radially inwardly from a hollow body of rotation and eventually from a second or inner body of rotation so that a high-frequency comminution of the mixture takes place to bring about exceptionally satisfactory homogenization of the mixture. In addition, since all zones of the hollow fluid bodies are subjected to such high-frequency comminuting action, the ultimate mixture is one of uniform homogeneousness.

Stripped to its essentials, the mixing apparatus of my invention comprises an outer tubular element, a rotary mixing element which comprises an apertured tubular portion received in and defining with the outer tubular element an annular chamber, means for rotating the mixing element, means for admitting two or more ingredients into the annular chamber at such pressure that the ingredients form a mixture and that the mixture is expelled or drawn radially inwardly through and into the interior of the tubular portion, and means for evacuating the mixture from the interior of the tubular portion.

The novel features which are considered as characteristic of the invention are set forth in particular in the appended claims. The invention, together with additional objects and advantages thereof, will be best understood from the following detailed description of certain specific embodiments with reference to the accompanying drawings, in which:

FIG. 1 is an axial section through a mixing apparatus which embodies one form of my invention and which is utilized for the practice of my method;

FIG. 2 is a fragmentary axial section through a slightly modified mixing apparatus;

FIG. 3 is a fragmentary developed view of a rotary mixing element which forms part of the mixing apparatus shown in FIG. 2; and FIG. 4 is a side elevational view of a different rotary mixing element.

Referring now in greater detail to the illustrated embodiments, and first to FIG. 1, there is shown a two-stage mixing apparatus which comprises a readily disassembleable composite housing including a tubular main body portion 1 having an open end connected to an apertured cover or cap 2 by means of bolts 3 which compress an annular packing 4 inserted into a recess provided in the inner side of the cover 2. The bore of the main body portion 1 comprises a larger-diameter section 5 which extends inwardly from the open end thereof and which accommodates an outer tubular element here shown as a cylindrical liner or sleeve 6. The internal space of the liner 6 receives with slight tolerance a specially constructed rotary mixing element or head 7 so that the parts 6 and 7 define between themselves an annular outer chamber 8. The mixing element 7 assumes the shape of a cup whose bottom wall 7a is integral with or is rigidly secured to a rotary drive shaft 9, the latter forming part of a means for rotating the mixing element at requisite speed when the apparatus of FIG. 1 is in actual use. As shown, the shaft 9 extends through the smaller-diameter section 5a of the bore in the main body portion 1. For example, the drive shaft 9 may be rotated by a suitable electric, hydraulic or pneumatic motor, not shown. That portion of the shaft 9 which is immediately adjacent to the bottom wall 7a of the mixing element 7 and which is received in the section 5a constitutes a screw 10 and serves as a conveying means for admitting a plurality of different ingredients from an annular passage 11 into one axial end of the aforementioned outer chamber 8, the passage 11 receiving such ingredients through a first nipple 12 whose material-admitting tip is screwed into a radial bore of the main body portion 1, and through a second nipple 13 which is screwed into a socket 14 welded to the outer side of the main body portion 1. The material-admitting inlet opening 15 which receives a first flowing ingredient from the nipple 12 communicates with the annular passage 11 at a point which is more distant from the inner axial end of the outer chamber 8 than the second material-admitting inlet opening 16, the latter receiving a second flowing ingredient from the nipple 13.

The shaft 9 is journalled in a bearing sleeve 17 which is surrounded by annular packings 18 forming part of a stuffing box whose gland is not shown in FIG. 1. It will be noted that the packings 4 and 18 seal the chamber 8 and the annular passage 11 from the atmosphere so that the mixture of ingredients formed in the chamber 8 is expelled radially inwardly through axially parallel apertures 19 provided in the tubular portion 7b of the mixing element 7, and the mixture thereupon flows into an inner annular chamber 20 which is surrounded by the internal wall of the rotary mixing element. The tubular portion 7b preferably assumes the shape of a cylinder one end of which is open and the other end of which is sealed by the wall 7a. The apertures 19 assume the form of open slots which terminate at the open lower end of the mixing element 7, i.e., at that end of the tubular portion 7b which is distant from the conveying screw 10. The second or inner chamber 20 is defined by the tubular portion 7b of the mixing element 7 and by an inner tubular element here shown as an extension 22 of a nozzle 21 which latter serves as a means for evacuating a thoroughly homogenized mixture from the chamber 20. As shown, the externally threaded outer portion of the extension 22 is screwed into the cover 2 and the coaxial channel of the nozzle 21 comprises a smaller-diameter outer section 23 which communicates with a larger-diameter inner section 24, the latter being formed in the interior of the tubular extension 22 and communicating with the chamber 20 through a series of uniformly distributed elongated axially parallel slots 25 provided in the wall of the extension 22. The open inner end of this extension is sealed by a screw 26 so that a homogenized mixture which is expelled radially inwardly through the slots 25 and into the channel section 24 is thereupon compelled to flow into the channel section 23 and is thereupon evacuated from the mixing apparatus in the axial direction of the element 7.

The apparatus of FIG. 1 operates as follows:

The shaft 9 drives the mixing element 7 at high speed and the nipples 12, 13 continuously admit two streams of different flowing ingredients at elevated pressure. The screw 10 conveys that ingredient (e.g., a monomer) which is admitted through the nozzle 12 toward the discharge end of the inlet opening 16 which admits a second ingredient (e.g., a solvent or an emulsifying agent) so that the two ingredients are combined and that some partial or preliminary mixing takes place right in the annular passage 11. The resultant unhomogenized mixture is thereupon admitted in the axial direction and into the upper end of the outer chamber 8 in which the ingredients form a hollow body of rotation and in which a further mixing action takes place before the resultant more thoroughly homogenized mixture is expelled through rapidly revolving slots 19 of the mixing element 7 and radially inwardly into the inner chamber 20. Additional mixing takes place when the revolving and by now highly homogenized mixture filling the inner chamber 20 is expelled radially inwardly through the slots 25 of the fixed extension 22 before entering the channel section 24 on its way to the discharge end of the channel section 23. It will be noted that evacuation of the mixture takes place in the axial direction of the hollow rotary bodies formed by the ingredients in the chambers 8 and 20. The mixture entering the channel section 23 is fully homogenized, and the duration of its travel from the annular passage 11 to the channel section 23 is very short because the volumes of the chambers 8, 20 are normally rather small which means that dead space is reduced to a minimum. In other words, there is little or no room for accumulation of individual ingredients or of partly homogenized mixture because, by flowing radially inwardly from the outer chamber 8 to the channel section 24, the mixture is compelled to flow counter to the action of centrifugal force. This is due to the fact that the screw 10 subjects the ingredients to a pressure which is high enough to induce the mixture to flow radially inwardly and to avoid any accumulation of partly homogenized mixture in the mixing apparatus. The rate at which the nipples 12, 13 continuously admit additional quantities of the respective ingredients is the same at which some mixture is expelled radially inwardly at several points of the hollow fluid body in the chamber 8 (slots 19), at which some mixture is expelled radially inwardly from the hollow fluid body in the chamber 20 (slots 25), or at which the ultimate mixture is evacuated in the axial direction of the two fluid bodies.

The entire mixing apparatus may be taken apart in a very simple and time-saving manner. All that is necessary is to unscrew the nozzle 21, the nipples 12, 13, the gland which retains the packings 18, the bolts 3, and the screw 26. This enables an operator to clean all component parts which come into actual contact with the flowing ingredients before the apparatus is to be used for mixing of different ingredients.

The dual mixing action which takes place in and during expulsion of mixture from the chambers 8 and 20 is attributable to the fact that a revolving slotted or apertured median mixing element 7 is installed between an unslotted outer tubular element or liner 6 of the composite housing which is stationary and an inner tubular element or extension 22 which is apertured and which is either stationary or which revolves at a speed different from the rotational speed of the element 7. In most instances, the extension 22 need not be driven but it is equally within the scope of my invention to rotate this extension in or counter to the direction in which the element 7 is driven by the shaft 9. The extension 22 produces a high-frequency mixing affect because batches of the rapidly revolving mixture filling the inner chamber 20 penetrate at rapidly following intervals into the channel section 24. Such high-frequency mixing action produces a thoroughly homogenized mixture which, insofar as I am aware at this time, cannot be obtained with mixing apparatus of conventional design. Moreover, and since the mixture flows radially inwardly rather than under the action of centrifugal force, the apparatus of my invention is especially suited for mixing of such ingredients whose specific weights are different without in any way affecting the homogeneousness of the ultimate mixture. It is well known that, if a mixture is formed by centrifugal force, i.e., in an apparatus in which the ingredients are hurled radially outwardly against the outer wall of a mixing compartment, the ingredient of greater specific weight is likely to form a layer along the outer wall and the resulting mixture, if any, is of inferior homogeneousness.

In some instances, the hollow body of rotation which the combined ingredients form while being expelled from the chamber 8 is immediately homogenized to such an extent that it can be withdrawn radially inwardly and thereupon axially thereof without additional mixing in the second chamber 20. Such one-stage mixing or homogenizing action may be carried out in a greatly simplified apparatus in which the nozzle 21 terminates at the open end of the tubular portion 7b.

If necessary, the housing of my improved mixing apparatus may be provided with three or more inlet openings so that the outer chamber 8 may receive more than two ingredients.

It can be said that, when two or more ingredients are mixed in the apparatus of my invention, at least a substantial part (if not nearly all) of the mixing action can take place while the mixture is being expelled through the slots 25 and/or 19, whereas the chambers 8 and 20 mainly serve as compartments for accommodation of partially homogenized mixture prior to high-frequency mixing during expulsion or withdrawal of mixture through the slots or apertures 19 and 25.

The mixing element 7 is of considerable advantage when the mixture formed in the chamber 8 is one of high viscosity because the open slots 19 may be readily cleaned if it should become necessary to convert the apparatus for use in connection with a different group of ingredients. On the other hand, the longitudinal edges of the surfaces bounding such axially parallel slots 19 bring about a very satisfactory high-frequency comminuting action upon the contents of the mixture while such contents are caused to flow from the chamber 8 into the chamber 20.

FIG. 2 illustrates a portion of a mixing apparatus which is especially suited for producing a homogeneous mixture of very hard-to-mix e.g., highly viscous ingredients. All component parts of this apparatus, with the exception of the rotary mixing element 107, are identical with the corresponding parts of the apparatus shown in FIG. 1. The element 107 assumes the shape of a cup including a bottom wall 107a which is integral with or which is secured to the conveying screw 10, and a tubular (preferably cylindrical) portion or mantle 107b which is provided with elongated axially parallel open slots 119 and with external stirring projections or teeth 127 which produce a stirring effect in the hollow fluid body filling the outer chamber 108 and which are illustrated in greater detail in FIG. 3. These stirring projections extend into the outer chamber 108 so that their outermost faces are preferably closely adjacent to the liner 6. Consequently, the projections 127 bring about an additional mixing or stirring effect even before the mixture filling the outer chamber 108 enters the slots 119. Consequently, homogenization of the mixture entering the inner chamber 120 is greatly advanced and is then completed while the mixture is expelled through the slots 25 and into the channel section 24.

In accordance with a feature of my invention, the stirring projections 127 preferably assume a rhomboidal shape (see FIG. 3) and are distributed along the outer side of the tubular portion 107b in such a way that each zone of the hollow fluid body filling the outer chamber 108 is subjected to an intensive mixing and stirring action. The projections 127 may be arranged in rows which are parallel with the axis of the mixing element 107, and the projections in adjacent rows are staggered with respect to each other. It will be noted that each projection 127 comprises a sharp leading edge 128 which acts not unlike the cutting edge of a knife when the element 107 rotates in the direction indicated by the arrow 129.

The projections 127 may be formed in a very simple and economical way in a thread cutting machine by machining into the periphery of the tubular portion 107b a first helical groove (arrow 130) and by thereupon machining a second helical groove (arrow 131) of opposite pitch. The material remaining between the intersecting helices of such grooves then forms the projections 127. Of course, such projections may be formed in a different way if desired or if a thread cutting machine is not available.

Since the projections 127 extend into close proximity of the outer tubular element or liner 6, the volume of dead space in the outer chamber 108 is reduced to a minimum. As the liner 6 is fixed to the main body portion 1, it can be considered to constitute a component part of the housing.

It will be noted that the configuration, cross-sectional areas and distribution of apertures or slots 19, 119, 219 and 25 depend to a great extent on the viscosity of the mixture, and that the apparatus of my invention can be readily converted for homogenization of different types of mixtures merely by exchanging the rotary mixing element 7, 107 or 207 and/or the nozzle 21.

Referring finally to FIG. 4, there is shown a different rotary mixing element 207 which is provided with a large number of circular apertures or slots 219. This mixing element may be utilized when the viscosity of the ingredients is low and when the ingredients are readily combined into a homogeneous mixture. It will be noted that the distribution of slots 219 is similar to the distribution of stirring projections 127 so that partly homogenized mixture may be expelled or withdrawn at several uniformly distributed points of the hollow fluid body which fills the outer chamber. If the mixing apparatus utilizes a rotary mixing element of the type shown in FIG. 4, the extension 22 of the evacuating nozzle 21 is preferably provided with circular apertures or slots similar to the slots 219. Such modification of the extension 22 is so obvious that it can be readily comprehended without additional illustration.

The shaft 9 may be driven at a speed of 600 to 1400 r.p.m. In the embodiment of FIG. 1, the outer diameter of the chamber 8 is 30 mm., the inner diameter of this chamber is 23 mm., the outer diameter of the chamber 20 is 16 mm., and the inner diameter of this last mentioned chamber is 14 mm. Of course, these dimensions will change with changes in capacity of the mixing apparatus, with changes in the composition of various ingredients, etc.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for mixing a plurality of flowable ingredients which comprises a housing member having a longitudinal bore, a rotatable first mixing member positioned coaxially within and spaced radially inwardly from said bore, said first mixing member having the configuration generally of a cup with an exterior sidewall which is in juxtaposition with the interior sidewall of the bore and which has a plurality of apertures in the sidewall thereof, means for rotating said first mixing member, a second mixing member positioned coaxially within and spaced radially inwardly from said first mixing member, said second mixing member having the configuration generally of a tube closed at one end thereof adjacent the base of said cup and open at the opposite end thereof for discharge of mixed flowable ingredients, the exterior sidewall of said tube being in juxtaposition with the interior sidewall of said cup and having a plurality of apertures therein, and means for admitting a plurality of flowable ingredients between the sidewall of the bore and the exterior sidewall of the cup under sufficient pressure to cause said ingredients to pass through said apertures for discharge from said open opposite end of said tube while said first mixing member is being rotated.

2. An apparatus as in claim 1 which includes means for rotating said second mixing member.

3. An apparatus as in claim 1 which includes a plurality of stirring members projecting out from the sidewall of said cup toward the wall of said bore.

4. An apparatus as in claim 1 in which the apertures of said first and second mixing members are approximately the same in size.

References Cited by the Examiner
UNITED STATES PATENTS

| | | | |
|---|---|---|---|
| 1,387,380 | 8/1921 | Fryer | 259—7 |
| 1,487,208 | 3/1924 | Cooke. | |
| 2,559,516 | 7/1951 | Russell. | |
| 2,706,108 | 4/1955 | Miner | 259—8 |
| 2,957,203 | 10/1960 | Marshall | 259—7 X |

CHARLES A. WILLMUTH, *Primary Examiner.*

G. J. NORTH, *Examiner.*